United States Patent
Guter et al.

(10) Patent No.: US 10,343,223 B2
(45) Date of Patent: Jul. 9, 2019

(54) ROTARY TOOL AND METHOD FOR MANUFACTURING A ROTARY TOOL

(71) Applicant: Kennametal Inc., Latrobe, PA (US)

(72) Inventors: Tim Guter, Fürth (DE); Peter Sollfrank, Waldthum (DE)

(73) Assignee: KENNAMETAL INC., Latrobe, PA (US)

(*) Notice: Subject to any disclaimer, the term of this patent is extended or adjusted under 35 U.S.C. 154(b) by 0 days.

(21) Appl. No.: 15/179,534

(22) Filed: Jun. 10, 2016

(65) Prior Publication Data
US 2016/0361769 A1 Dec. 15, 2016

(30) Foreign Application Priority Data

Jun. 12, 2015 (DE) .................. 10 2015 210 8171

(51) Int. Cl.
*B23B 51/02* (2006.01)
*B24B 3/26* (2006.01)

(52) U.S. Cl.
CPC .............. *B23B 51/02* (2013.01); *B24B 3/26* (2013.01); *B23B 2251/046* (2013.01); *B23B 2251/14* (2013.01); *B23B 2251/18* (2013.01)

(58) Field of Classification Search
CPC .......... B23B 2251/046; B23B 2251/14; B23B 2251/18; B23B 2251/28; B23B 51/02;
(Continued)

(56) References Cited

U.S. PATENT DOCUMENTS 4,826,368 A * 5/1989 Tikal .................. B23B 51/02
408/225
5,486,075 A * 1/1996 Nakamura ............ B23B 51/02
408/224
(Continued)

FOREIGN PATENT DOCUMENTS

DE 19955172 A1 5/2001
DE 4417166 B4 2/2006
(Continued)

OTHER PUBLICATIONS

Aug. 11, 2017 First office action.
Sep. 10, 2018 Foreign OA.

*Primary Examiner* — Nicole N Ramos
(74) *Attorney, Agent, or Firm* — Matthew S. Bedsole

(57) ABSTRACT

The invention relates to a rotary tool, in particular a drill (2), which extends along a longitudinal axis (4), having an end face (6); a center (12); at least two main cutting edges (8), each of which extends from the center (12) outwards towards a cutting corner (10); a flute (20) associated with each main cutting edge (8), a flank on the end face (18), associated with each main cutting edge (8); a rake angle (γ) between the respective main cutting edge (8) and the flute (20); a ground face (26) which forms a point thinning (30) in the area of the center (12), extends into a radially outer area and defines the rake angle (γ) in the area of the main cutting edge (8). The rotary tool is characterized in that the rake angle (γ) formed by the ground face (26) is constant along the main cutting edge (8), and the flank (18) of the other main cutting edge (8) is formed by the ground face (26). An advantageous, excellent cutting behavior is thereby achieved along the main cutting edge (8). The invention further relates to a method for manufacturing the rotary tool, which is then especially simple to produce.

8 Claims, 5 Drawing Sheets

(58) Field of Classification Search
CPC . B24B 3/26; Y10T 408/9097; Y10T 408/909; Y10T 408/9095
See application file for complete search history.

(56) References Cited

U.S. PATENT DOCUMENTS

| | | | | |
|---|---|---|---|---|
| 7,530,772 | B2* | 5/2009 | Reinhardt | B23B 51/02 408/227 |
| 2003/0002941 | A1* | 1/2003 | Borschert | B23B 51/02 408/230 |
| 2008/0089753 | A1* | 4/2008 | Takikawa | B23B 51/02 408/230 |
| 2010/0028098 | A1* | 2/2010 | Shaffer | B23B 51/02 408/230 |
| 2010/0322726 | A1* | 12/2010 | Glimpel | B23B 51/02 408/57 |
| 2012/0076597 | A1* | 3/2012 | Krenzer | B23B 51/02 408/227 |
| 2012/0183367 | A1* | 7/2012 | Kress | B23B 51/02 408/145 |
| 2012/0201619 | A1* | 8/2012 | Olsson | B23B 51/02 408/230 |
| 2013/0045058 | A1* | 2/2013 | Schwagerl | B23B 51/02 408/230 |
| 2013/0142583 | A1* | 6/2013 | Arai | B23B 51/02 408/229 |

FOREIGN PATENT DOCUMENTS

| | | |
|---|---|---|
| DE | 102010006797 B4 | 12/2011 |
| JP | 2014166660 A | 9/2014 |

* cited by examiner

ROTARY TOOL AND METHOD FOR MANUFACTURING A ROTARY TOOL

RELATED APPLICATION DATA

The present application claims priority pursuant to 35 U.S.C. § 119(a) to German Patent Application Number DE1020152108171 filed Jun. 12, 2015 which is incorporated herein by reference in its entirety.

FIELD

The invention relates to a rotary tool, in particular a drill having the features of the preamble of claim 1 as well as a method for manufacturing such a rotary tool.

BACKGROUND

EP1 748 859 B1 describes what is known as a spade bit in which two main cutting edges are connected in the region of a center via a chisel edge. The main cutting edges lie in a common horizontal end face plane. The main cutting edges also extend in a straight line. In the area of the center and the chisel edge, a point thinning is made in a separate grinding step, the ground face thereby being formed extending outward in a radial direction to a cutting corner and forming a face land which is oriented at a rake angle. Blind holes having a flat bore base can be reliably produced with a spade bit of this sort.

EP 1 230 058 B1 describes a drill bit with main cutting edges onto each of which joins a flank, the flanks respectively having two sub-regions that transition into one another homogeneously and edgelessly. A method for grinding the drill bit is also described in which the flank is formed as a curved surface in one sub-region. In operation, the load on the drill bit is less due to this embodiment with a shoulderless surface profile.

SUMMARY

Starting from this, the invention is based on the object of providing a rotary tool, in particular a drill, which enables good cutting performance. The objective is achieved according to the invention by a rotary tool having the features according to one or more claims provided herein as well as by a method having the features according to disclosure and/or claims provided herein. Advantageous embodiments, refinements and variants are the subject matter one or more claims, such as the dependent claims. The designs in connection with the rotary tool, as well as its advantageous further developments, also correspondingly apply to the method and vice versa.

The rotary tool is thereby designed specifically as a drill and extends along a longitudinal axis. An end face is formed on the front side, on which end face are located at least two main cutting edges which extend from a cutting corner in a radial direction to an internal center. The rotary tool is a fluted tool having at least one flute per main cutting edge. The center is formed by a central core of the material of the drilling tool. On the end face, the drill terminates at a center point which is on the longitudinal axis. The longitudinal axis simultaneously also defines a rotational axis around which the rotary tool rotates when in operation. In addition to the (typically ground) flute, an additional ground face is introduced. This extends along each main cutting edge from the center up to a radial outer region in the area of the main cutting edge. For each of the main cutting edges, a corresponding ground face is preferably respectively formed. In the center, the ground face serves to form a point thinning, and in the further course of the respective main cutting edge the ground face serves to form and define (i.e. to establish) a rake angle. This means that, in the area of the main cutting edge, the ground face forms a face land defining the rake angle. The rake angle that is formed in this way is constant along the main cutting edge, and therefore always has the same value at different radial positions along the main cutting edge. Moreover, a flank which extends back from the respective main cutting face is associated with each of the main cutting edges at the end face. The flank is thereby at least partially—in particular largely and preferably fully—a part of the ground face and, indeed, such that the ground face which is associated with one of the two main cutting edges forms that flank which is associated with the other main cutting edge.

The feature that the ground face extends up to an outer radial area is understood to further include, in particular, that the ground face originating from the center—that is, from the rotational axis—extends over at least 60% and preferably over 80% of a nominal radius of the rotary tool.

By this design with the ground face, on the one hand the formation of a rake angle independent of the previously ground chip flute is made possible so that a rake angle suitable for a respective machining task may be ground in a simple manner via the additional common ground face, independent of the formation of the flute. Regrinding may also then be performed very easily. The uniformly constant rake angle further leads to the situation that the rotary tool advantageously also maintains its cutting efficiency even in the center, i.e. near the chisel edge, especially as compared to the outer section of the main cutting edge. This especially guarantees homogeneous cutting conditions, particularly over the whole main cutting edge. Another advantage is in particular that the flank is also simultaneously formed by the ground face in the same grinding step. Therefore, a total of three functional face sections are available via the ground face, namely the flank, the point thinning and the face land.

Rake angle here is understood to be the angle between a vertical plane which extends in the direction of the longitudinal axis and the ground face below the main cutting edge. The rake angle is formed by the introduction of the ground face. The main cutting edge and the adjacent area of the chip flute are thus ground in the corresponding grinding step. The ground face thereby has the face land as a partial surface which then extends in particular from the main cutting edge up to the chip flute—that is, between the main cutting edge and the chip flute—and there forms the rake angle. The face land towards the chip flute is bounded in particular by a ground edge which is formed during the grinding of the ground face by the removal of material in the area of the main cutting edge. The ground edge accordingly delimits the chip flute with respect to the ground face and forms a part of a border of the ground face. The point thinning, as a partial surface of the ground face in the area of the chisel edge, advantageously merges edgelessly into the face land, significantly reducing the mechanical stresses in the operation of the rotary tool. The remaining portion of the ground face, which forms the flank and runs towards the chip flute, is then bounded in particular by the ground edge toward the chip flute.

The flank preferably transitions edgelessly into the ground face. Avoiding a corresponding edge on the end face specifically leads to reduced mechanical load and, in operation, to a power distribution on the end face that is improved overall. The flank adjoins the main cutting edge in particular at its rear, i.e. behind it in the rotation direction; in the case of multiple main cutting edges, corresponding to a preceding main cutting edge in the rotation direction. In forming the ground face, this then (so to speak) continues the flank toward the flute, the transition between flank and remaining ground face being executed edgelessly and particularly with a curve.

In a preferred refinement, the point thinning transitions edgelessly into the remaining ground faces. In this way, the operational forces are distributed optimally in this area. Additionally, the point thinning and the ground face can be ground in one pass and can preferably also be ground together via only one grinding step, which simplifies the manufacturing process overall.

Expediently, the ground face and the flank (as a partial surface of the end face) together form a completely edgeless end face which then has no inside edges and is bounded by the main cutting edge or main cutting edges, the chisel edge and the ground edge. This then produces an especially uniform end face geometry overall, preferably manufactured in one pass. Upon grinding, the rake angle is then set advantageously in the same grinding step, i.e. a rake angle correction is performed and the end face geometry is formed edgelessly. In other words: the point thinning, the flank and the face land are formed in one pass as a contiguous edgeless ground face. In this regard it is additionally advantageous that only one grinding disc is necessary and the grinding process is accordingly simplified. Furthermore, the entire end face geometry may be manufactured by moving the grinding wheel along only one single sliding track, and is therefore also preferably produced in this way. The rotary tool is thereby particularly inexpensive to manufacture.

In one preferred embodiment, the ground face extends continuously, starting from the center out to the cutting corner. In this way it is ensured that the rake angle along the entire main cutting edge is constant and the rotary tool has a correspondingly advantageous cutting behavior. Furthermore, a particularly homogeneous cutting force curve results along the main cutting edge, and with it an optimum power distribution during operation.

In principle, it is possible to make a cutting corner with a corner shape and/or with a secondary cutting edge shape, for example a chamfer or a radius or a fillet. This corner or secondary cutting edge shape is formed as a simple beveled grinding surface, for example. In such a case, the ground face likewise extends up to the cutting corner whose beginning is defined by the shape of the corner.

The chip flute is oriented in a helix angle with respect to the longitudinal axis, which helix angle indicates the helix pitch given a coiled chip flute. The chip flute additionally has a flute wall which forms an interior wall of the flute, along which the removed chips in particular are conveyed during operation. The chip flute wall, and thus also the chip flute, are delineated in relation to the ground face by the ground edge, meaning that the chip flute ends at the ground face. With respect to the longitudinal axis, the chip flute thereby ends in the area of the main cutting edge at a flute angle which, in one preferred embodiment increases, from the center outward to the cutting corner. Typically, the flute angle approximately corresponds to the helix angle, at least in the radial outer area, in particular on an outer wall of the rotary tool. The flute angle at a radial position is thereby measured in a sectional plane parallel to the longitudinal direction, the flute angle being measured in several such cutting planes that are parallel to each other to determine the flute angle at different radial positions.

Strong forces usually occur during operation, especially in the center, in particular stronger than in the outer area of the cutting corner. Via the flute angle which is reduced in the center, a reinforced, more massive cutting wedge is then formed with relation to the outer area in particular, which particularly effectively absorbs the applied forces. The flute angle preferably increases continuously towards the outside and therefore does not decrease.

Near the center, the flute angle appropriately is essentially 0°, i.e. in a range from −1 to +1°. The ground face in this area particularly runs in the longitudinal direction. Thus, an especially sturdy cutting wedge is formed near the center and the rotary tool is correspondingly robust.

In one particularly appropriate embodiment, the rake angle is in a range from 5 to 20° or to 30°, and especially in the range from 10 to 15°. Thus, overall a comparatively sharp cutting wedge is formed, so that the drill bit is as a whole excellent for cutting, owing to the constant rake angle both in the area of the cutting corner and in the center.

The rake angle is basically defined by the flute angle. Depending upon the choice of the flute angle, the rake angle at the cutting corner may therefore be greater than 20° and assume values up to the maximum for the flute angle. This is appropriately in a range from 10 to 40°. The flute angle is preferably in a range from 20 to 30°, and the rake angle then is correspondingly in a range from 5 to 20°.

In one particularly preferred embodiment, the main cutting edge extends in a straight line. This has the advantage that the main cutting edge, i.e. particularly the cutting wedge and the ground face that runs between the main cutting edge and the ground edge, must only clear away a removed chip and directly does not need to compress it, as would be the case given a curved main cutting edge. The forces on the main cutting edge are correspondingly reduced due to the absence of this compression.

For the manufacture of the rotary tool, the cutting face is advantageously introduced in a single grinding step, i.e. in particular along only a single sliding track, and the rake angle is thus formed in the area of the main cutting edge, the rake angle being formed uniformly from the center to the cutting corner. The flank is also formed by this, i.e. at least a part of the flank and preferably the entire flank as a section of the ground face. This method is very simple, and the rotary tool produced in this manner is especially cost effective. Additionally, via this formation of the end face geometry in one pass, so to speak, any edges are advantageously avoided; via the method the end face is thus further developed completely edgelessly and is only delineated by edges, namely by the main cutting edge, the chisel edge and—toward the flute—by the ground edge.

In forming the ground face, the grinding disc is preferably rolled with its peripheral surface over the end face of a rotary tool blank, a side face of the grinding disc being adjacent to the main cutting edge, thereby forming the face land. The point thinning, in particular, is formed by means of the side face and/or the peripheral surface, the grinding wheel being tilted in an appropriate manner along an axis parallel to the longitudinal axis at the transition between the chisel edge and the main cutting edge, and then no longer tilted during formation of the rake angle. In this way, the entire ground face is advantageously formed by moving only one grinding wheel along only one single sliding track.

The essential geometries that determine the cutting—in particular the rake angle, the point thinning and the flank or a continuation of the flank towards the chip flute—are advantageously formed as contiguous and edgeless surfaces. With such a homogeneous end face geometry, any mechanical stresses are distributed especially effectively since in particular the occurrence of load peaks on edges of the end face geometry is avoided due to the lack of such edges.

The end face as a whole is appropriately formed in the manner of conical shell. The end face is, in general, preferably only interrupted by the chip flutes which extend into the end face. Proceeding from a central point, any flanks thus slope away from the end face in a radial direction towards the outside. The flanks connect in a circumferential direction to the main cutting edges on the end face. "In the manner of a conical shell" here means different grinding variations, for example the conical surface grind, but also a multi-planed grind such as a four-faceted grind. The significant advantage compared to, for example, a spade bit is to be seen in that a central point for tapping is available, and thus a guidance of the drill is achieved specifically at the beginning of the drilling process.

An exemplary embodiment of the invention is explained in detail below in reference to the drawing. Respectively shown schematically therein are:

DETAILED DESCRIPTION

Figure 1:
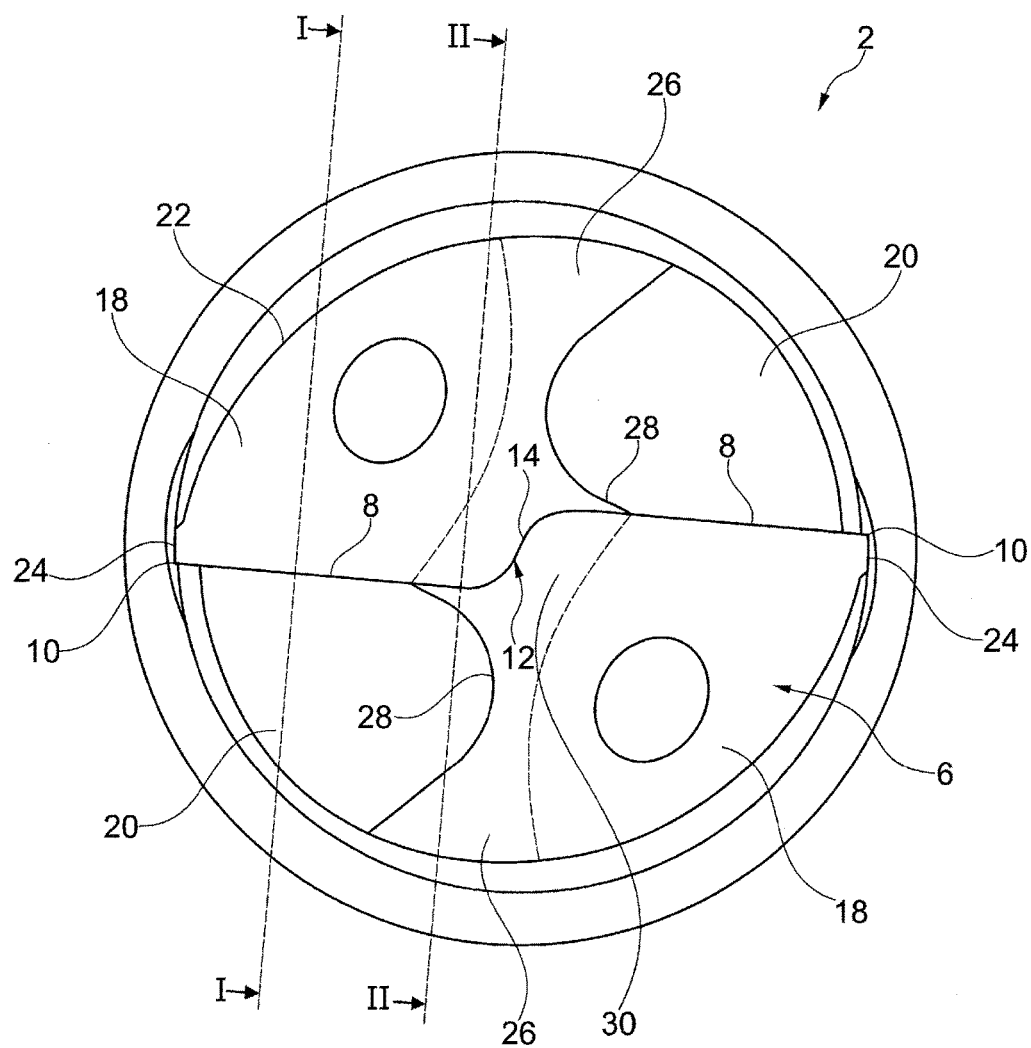
FIG. 1 an end face view of a drill,
FIG. 2 a partial first side view of the drill,
FIG. 3 a partial second side view of the drill rotated approximately 90° in comparison to FIG. 2,
FIG. 4 a partial side view, looking in the same direction as in FIG. 3, of a vertical radially outer sectional plane according to the section line I-I in FIG. 1, as well as
FIG. 5 a partial side view, looking in the same direction as in FIG. 3, of a vertical radial inner sectional plane according to the section line II-II in FIG. 1

The rotary tool depicted in Figures is formed as a drill 2 which extends in the longitudinal direction along a longitudinal axis 4, which simultaneously forms a rotational axis. The drill 2 has an essentially conical end face 6. The drill in the exemplary embodiment has two main cutting edges 8 which each extend in a straight line from an outer cutting corner 10 to a center 12. The two main cutting edges 8 are usually connected to each other in the center 12 by a chisel edge 14. As is to be learned in particular in the side views of FIGS. 2 and 3, the drill 2 has a somewhat raised center point 16 in the center 12. This is usually crossed by the chisel edge 14.

Because of its straight-line course and the rotational symmetry, according to which both main cutting edges 8 are rotationally offset by 180° with respect to the longitudinal axis 4, the two main cutting edges 8 run parallel to each other. Connected to each main cutting edge 8 is a flank 18, each of which forms a part of the end face 6. In the exemplary embodiment depicted here, coolant outlet (not shown in detail) is introduced into each flank 18. The essentially conical shell-shaped end face 6 is interrupted by chip flutes 20. In the exemplary embodiment, these extend helically along the drill 2. Thus, they are oriented along a helix angle α with respect to the vertical (see FIG. 2)

A drill surface 22 is circumferentially formed between each of the chip flutes 20. In the exemplary embodiment, a guide stage 24 is arranged in the transitional area from the chip flute 20 to the land 22.

Figure 2:
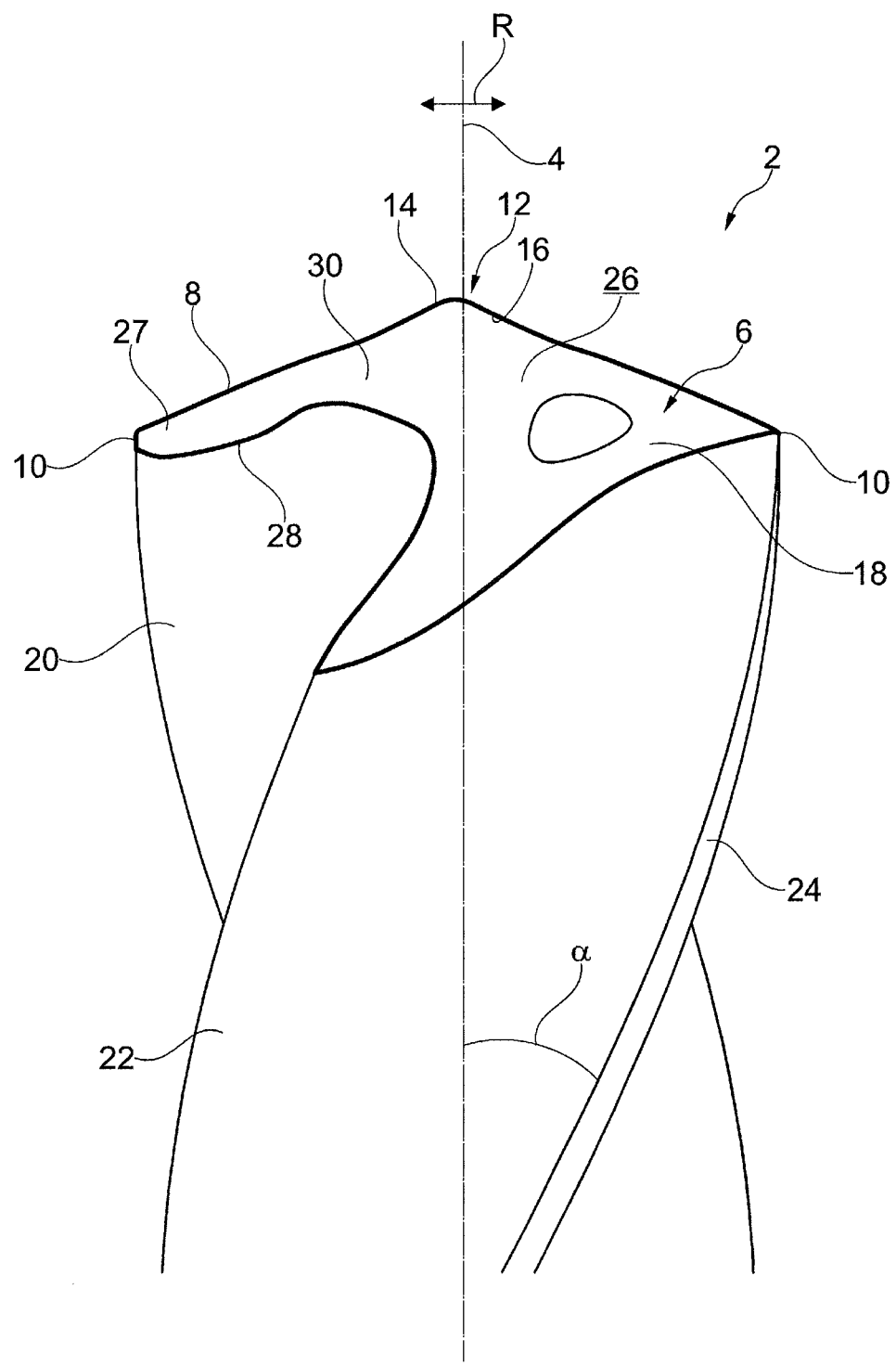
Figure 3:
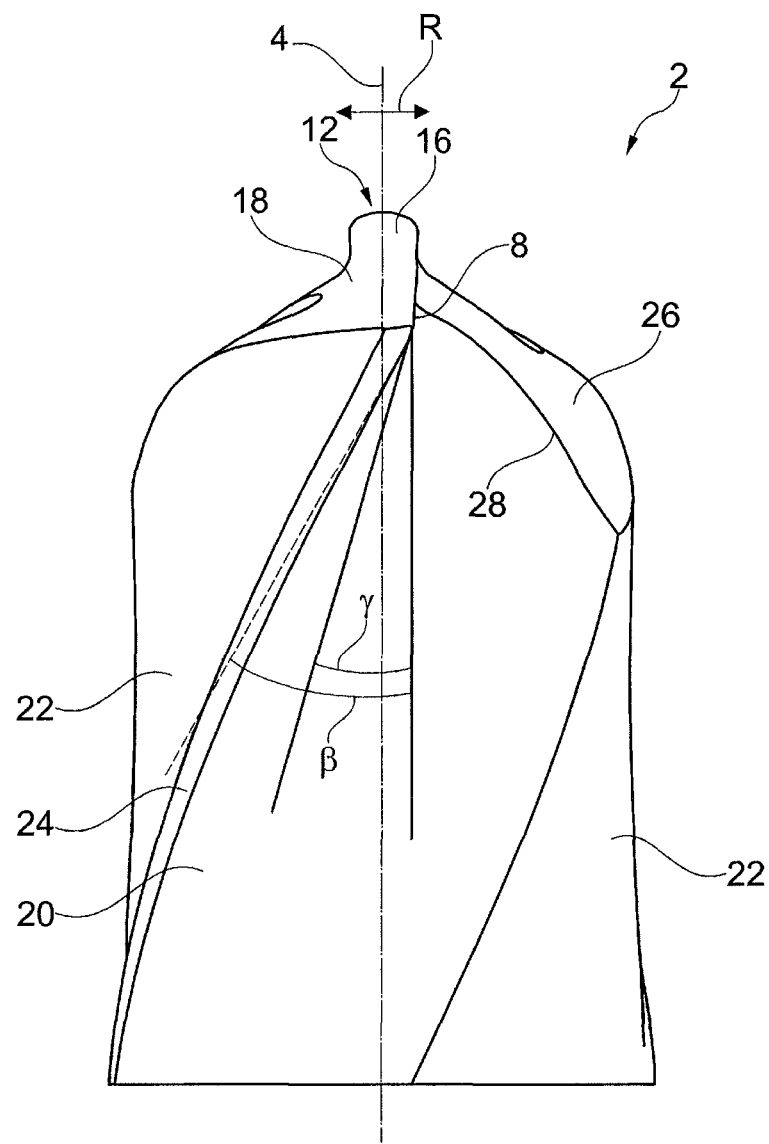

As can in particular be learned from the side view according to FIGS. 2 and 3, a ground face 26 has been introduced into the face end of the chip flute 20. This forms a contiguous and edgeless surface. The flank 18 is thus a part of the ground face 26. The edgeless transition between the flank 18 and the remaining ground face 26 is indicated in FIG. 1 by means of a dotted line. In FIG. 2, the border of the ground face 26 is represented by a thick line. The ground face 26 extends outwards as a uniform surface from the center 12 in the direction of the cutting corner 10, and reaches into an outer radial area. The ground face 26 thus preferentially reaches at least to the middle of the main cutting edge 8 and preferably—as illustrated in Figures—up to the cutting corner 10. Below the main cutting edge 8, a rake face 27 is then formed as a part of the ground face. 26. In the exemplary embodiment, the ground face 26 moreover extends on the end face end of the chip flute 20 into the transition area to the front face 6 over the complete chip flute 20, thus from the cutting corner 10 to the opposing end of the chip flute 20 where it transitions into the land 22. Thus, the ground face 26 and the chip flute 20 form a ground edge 28 which runs in a curve from the cutting corner 10 and past the center 12 around the chip flute 20.

The ground face 26 forms a point thinning 30 in the area of the center 12, which is a partial surface of the ground face 26 and transitions edgelessly into the remaining partial surfaces of the ground face 26. Since the ground face 26 runs further in the radial direction R, in particular continuously to the outer cutting corner 10, it also defines a rake angle γ of the main cutting edge 8. This is established as the angle between a vertical parallel to the longitudinal axis 4 and the ground face 26, as this is depicted in FIGS. 3 to 5, for example.

The rake angle γ is thus formed as a positive rake angle so that an acute-angled cutting wedge is present. During the grinding of the ground face 26, some of the flute wall in the area of the end face 6 is removed and the main cutting edge 8 is also ground. This reduces the helix angle α of the coiled flute 20 and forms a flute angle β along the ground edge and in relation to the longitudinal axis 4, in which the chip flute ends at the ground face 26, or more precisely at the face land 27. With this, the rake angle γ is less than the flute angle β. Generally, the rake angle γ at most attains the flute angle β, which may be up to 40°, for example. Preferably, the rake angle γ is in the range of approximately 10° to 15°.

Figure 4:
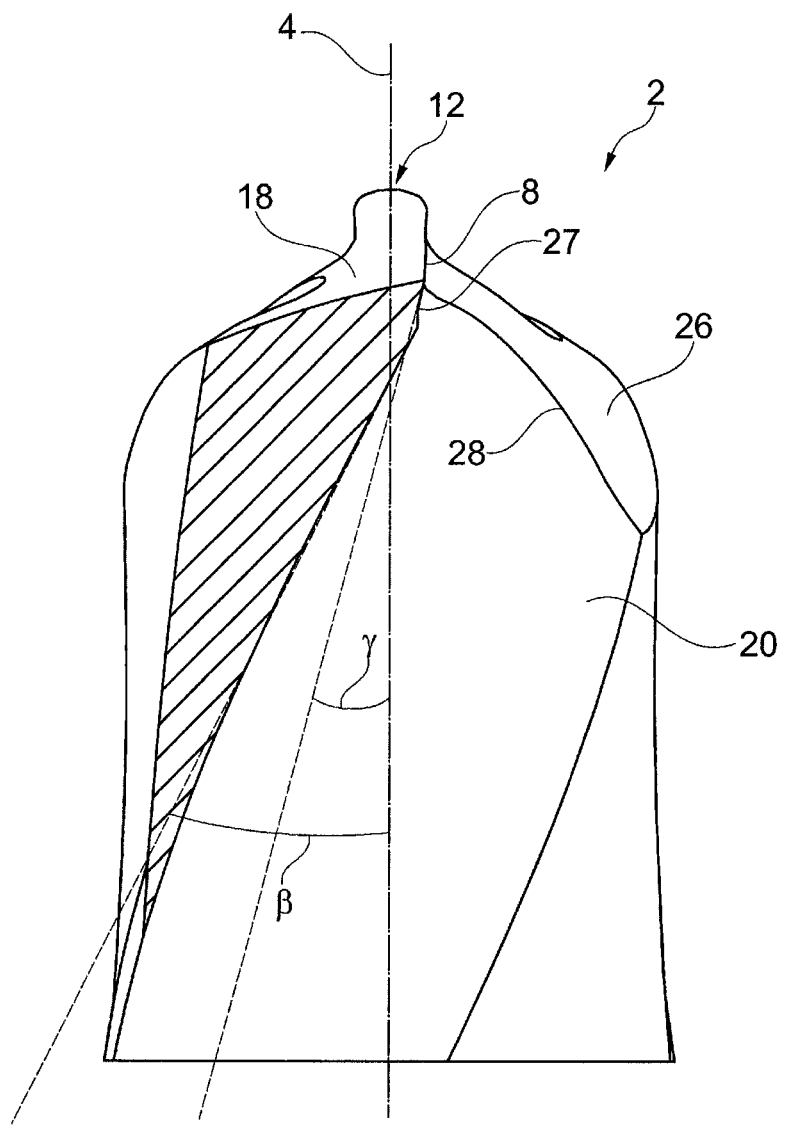
Figure 5:
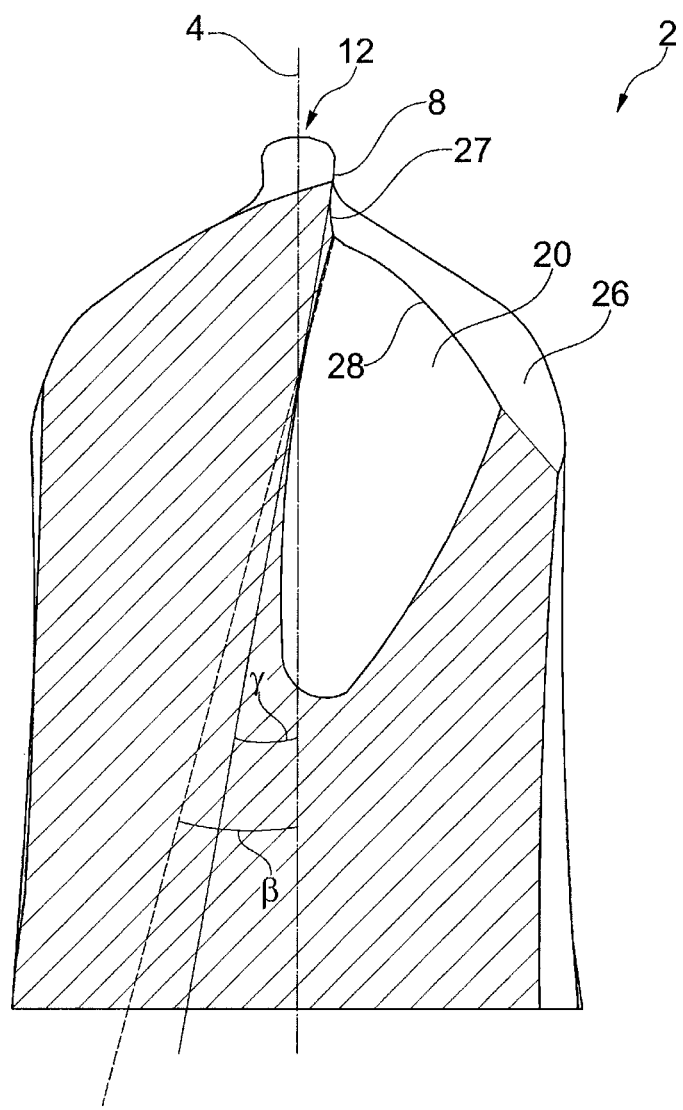

As is depicted in particular by comparison of the sections shown in FIGS. 3 to 5 along section planes parallel to each other, the rake angle γ is constant in the direction towards the center 12, whereas the flute angle β increases from the inside towards the outside. The rake angle γ is about 15° and leads to an excellent cutting behavior overall over the entire cutting face 8, which overall positively affects the cutting performance and the force required for machining. The change $\Delta\beta/\Delta r$ of the flute angle β in the radial direction R is thus constant. Thus, the ground face 26 and the main cutting edge 8 are each formed without bends. The flute angle β preferably changes continuously. In the center 12 itself—thus in the area of the point thinning 28—and therefore in the transitional area between the main cutting edge 8 and the chisel edge 14, the flute angle β is preferably 0°. Via the reduction to a range of approximately 0° for the flute angle β, in contrast a sturdy cutting wedge which withstands the stresses occurring during processing particularly well is formed in the center 12.

From a manufacturing standpoint, the formation of this sort of end face geometry is done in such a way that the ground face 26 is subsequently introduced in a single grinding step. For this, a grinding disc is used that is placed at a designated angle so that the desired rake angle γ is formed. During the grinding process, the grinding disc forms the flank 18 as a partial surface of the ground face 26, then rolls in a radial direction R over the flank 18 and thereby creates an edgeless transition between the flank 18 and the rest of the ground face 26. Using an appropriate tilt, the point thinning 30 is then formed. The relative angle position between the drill bit 2 and the grinding wheel accordingly remains constant, however, so that the rake angle γ is consistently formed in radial direction R. The flute angle β then results via the creation of the ground edge 28 at the transition between the chip flute 20 and the ground face 26, depending on the course of the chip flute 20.

As an alternative to the embodiment variation depicted here, there also exists the possibility of not completely implementing the ground face 26 up to the cutting corner 10. In this variant, the ground face 26 therefore terminates at a radial distance from the cutting corner 10. In this case, the distance is at most 60% or 50%—and preferably a maximum of 20%—of the nominal drill bit radius. This is defined as the radius of the rotational and longitudinal axis 4 up to the cutting corner 10.

Via the additional subsequent incorporation of the ground face 26, the ground edge 28 is formed in the transitional area between the ground face 26 and the continuing flute wall, which can be recognized in particular in FIG. 3 The difference between the rake angle γ and the flute angle β can also be learned easily at this point.

Overall, an improved cutting force distribution along the radial length of the main cutting edge 8 is achieved via the common ground face 26, which is subsequently introduced into the chip flute 20, and the continuously changing rake angle γ. In particular, because of the uniform, homogeneous, bend-free course, there is no risk of spikes in stress. Rather, the force acting on the cutting edge changes uniformly.

The invention claimed is:

1. A rotary tool which extends along a longitudinal axis comprising:
   an end face,
   a center,
   at least two main cutting edges, each of which extends outward from the center up to a cutting corner,
   a chisel edge at or adjacent the center connecting the at least two main cutting edges,
   a flute associated with each main cutting edge,
   a flank associated with each main cutting edge on the end face,
   a rake angle (γ) between the respective main cutting edge and the flute,
   a ground face which forms a point thinning adjacent the center and adjacent the chisel edge, extends into a radially outer area and establishes a land along at least one of the at least two main cutting edges, the land defining the rake angle (γ) with the longitudinal axis,
   wherein the rake angle (γ) formed by the land of the ground face is constant along the at least one main cutting edge, and in that, in addition, the flank of the other one of the at least two main cutting edges is formed by the ground face,
   wherein the flank edgelessly transitions into the rest of the ground face; and
   wherein the point thinning edgelessly transitions into the rest of the ground face.

2. The rotary tool according to claim 1, wherein the ground face extends continuously, starting from the center, to the cutting corner.

3. The rotary tool according to claim 1, wherein:
   the flute with the ground face forms a ground edge at the land at which the flute ends in a flute angle (β); and
   the flute angle (β) is defined relative to and measured with respect to the longitudinal axis, which flute angle (β) increases from the center of the rotary tool radially outward up to the cutting corner.

4. The rotary tool according to claim 3, wherein the flute angle (β) is −1° to +1° close to the center.

5. The rotary tool according to claim 1, wherein the rake angle (γ) is in a range from 5 to 30°.

6. The rotary tool according to claim 1, wherein each of the two main cutting edges extend in a straight line.

7. A method for manufacturing a rotary tool of claim 1, in which the ground face is introduced in a single grinding step, and the rake angle (γ) in the area of the main cutting edge as well as the flank are thereby formed.

8. The rotary tool according to claim 5, wherein the rake angle (γ) is in a range from 10 to 15°.

\* \* \* \* \*